Sept. 1, 1931.  R. RAPELLIN  1,821,404
GREASE GUN
Filed June 30, 1930
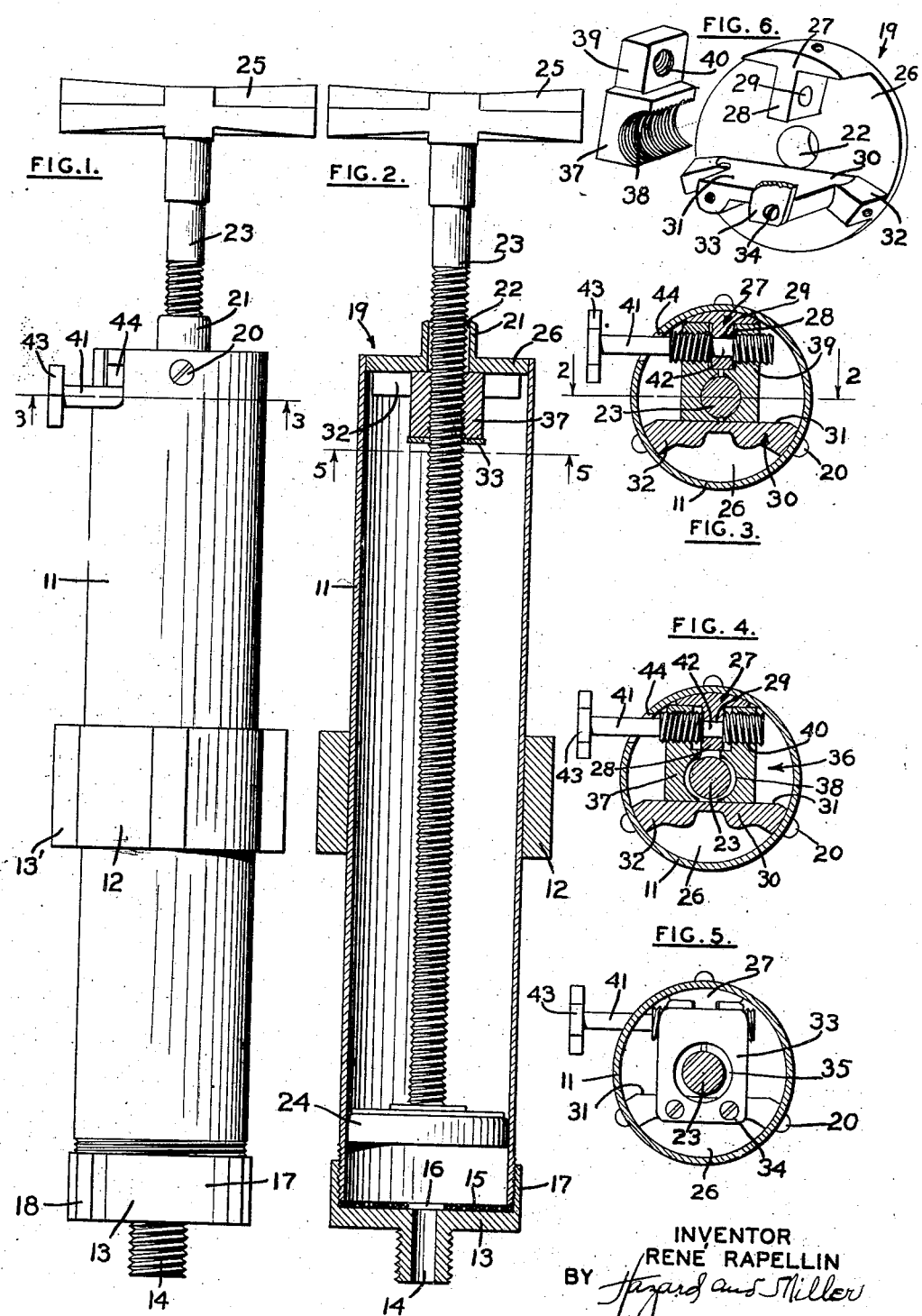
INVENTOR
RENE RAPELLIN
BY *Hazard and Miller*
ATTORNEYS Patented Sept. 1, 1931

1,821,404

UNITED STATES PATENT OFFICE

RENÉ RAPELLIN, OF SAN GABRIEL, CALIFORNIA

GREASE GUN

Application filed June 30, 1930. Serial No. 464,875.

My invention pertains to a grease gun or similar article in which a plunger or a piston is operated to expel the grease and is retracted to draw the grease into the gun. My invention pertains to a quick release for the stem or plunger operating the piston after expelling the grease to enable a quick refilling of the grease gun.

A particular object and feature of my invention is in a grease gun in which the piston or plunger is operated by a screw threaded stem or spindle operating through a nut-like structure to expel the grease by a movement of the plunger toward the outlet end of the gun, which is opposite the nut, and such nut is of a quick release type so that the screw threaded stem or spindle may be released from the nut after expelling the grease, and the stem or spindle retracted by a direct pulling action, and by such pulling action grease may be sucked into the discharge end of the gun after removing a closure head at such discharge end.

Another detailed object and feature of my invention is constructing the grease gun of a tube with a removable head with an opening therethrough for the stem. This closure head is provided with a transverse slideway in which is mounted a split nut, which nut is constructed in two halves with lateral extensions which are engaged by a right and left handed screw. Such screw has a mounting which prevents its longitudinal movement and is provided with a spindle extending laterally through the tubular wall of the grease gun adjacent the head so that by manipulating the spindle operated by a finger actuated nut, the nut may be engaged with the threads of the stem operating the plunger or piston, or disengaged therefrom.

My invention is illustrated in connection with the accompanying drawings in which:—

Fig. 1 is a side elevation of the grease gun.

Fig. 2 is a longitudinal section taken on the line 2—2 of Fig. 3.

Fig. 3 is a transverse section on the line 3—3 of Fig. 1 in the direction of the arrows, showing the nut in its closed position.

Fig. 4 is a view similar to Fig. 3 showing the nut in its open position.

Fig. 5 is a horizontal section on the line 5—5 of Fig. 2 taken in the direction of the arrows.

Fig. 6 is a perspective view of the guideway for the split nut and one of the halves of the nut.

In my invention I employ a grease gun barrel 11 which is indicated as having a collar 12 with projecting lugs 13' shrunk thereon to give a hand grip in holding the barrel of the gun. The discharge end of the barrel has a closure head 13 with an outlet duct 14 and is provided with a washer 15 having an aperture 16 in alignment with the duct 14. This closure head has a flange 17 which is screw threaded to the end of the barrel, and has lugs 18 to facilitate gripping for unscrewing the closure head.

The opposite end of the barrel is provided with a head 19 which has a slip connection in the end of the barrel and is held therein by screws 20 extending through the barrel into lugs or the like in the head 19. This head is provided with a ferrule 21 having an enlarged opening 22 for the passage of a screw threaded stem or spindle 23. This latter has a piston or plunger 24 swivelly connected to the lower end as is the usual practice in grease guns, and at the outer end the stem has an operating handle 25 to facilitate the rotation of the stem.

The head 19 has a disk-like top section 26, and at one side and depending therefrom there is a first bracket 27 having a radial partition 28 with a perforation 29 therethrough. Also depending from the disk 26 there is a second bracket 30 which has a finished, vertical face 31 parallel to a diameter of the barrel of the grease gun and parallel to the axis of the perforation 29. The bracket 30 has a pair of lateral lugs 32, each having one of the screws 20, and there is a third screw which extends into the bracket 27, preferably opposite the partition 28. There is a bottom plate 33 secured by screws 34 to the bracket 30, having an enlarged opening 35 through the center, which is for the stem 23. This plate, with the face 31 and the bottom of the disk 26, forms a guideway or slide track for a split nut, which is designated generally by the numeral 36.

This split nut has two halves 37, each formed identical and having a threaded section 38 to engage the stem 23. Each half also has a lateral extension 39 with a transversely threaded opening 40. These openings engage right and left hand threads on a spindle 41, which spindle has a cylindrical section 42 which is journaled in the perforation 29. The spindle has a finger-operated head 43 and is preferably assembled in the bracket 27 by having screw threads adjacent the head 43 threaded through one of the half nuts and the spindle fitting in the perforation 29. The other head is preferably made in the form of a tube which may be slipped on the spindle and threaded through the other part of the half nut and then soldered or welded to the spindle. The spindle extends outwardly through a slot 44 in the upper end of the barrel 11.

The manner of operation of the device is as follows:

After the piston or plunger 24 has been operated by rotating the handle and thus rotating the stem 23 through the split nut until the grease is discharged through the duct or passage 14 in the closure head 13, then the grease gun can be refilled by unthreading the closure head 13 and inserting the open end of the barrel 11 in a pot of grease. The spindle 41 may then be rotated to slide the two halves 37 of the split nut outwardly due to the right and left hand threads on this spindle, and such spindle is maintained from longitudinal movement by the center portion 42 engaging in the perforation 29 of the partition 28 of the bracket 27. When the split nut is spread apart it occupies the position shown in Fig. 4. The stem 23 with the piston 24 may then be pulled upwardly in the gun barrel by pulling on the handle 25 and thus suck grease into the open lower end of the barrel until the piston comes in contact with the plate 33 attached to the bracket 30. Rotating the stem 41 in the opposite direction then clamps the split nut on the operating spindle 23, and after replacement of the closure head 13 grease may again be expelled by rotating the handle 25 and the stem 23.

Various changes may be made in the details of construction without departing from the spirit or scope of the invention as defined by the appended claims.

I claim:

1. In a grease gun having a screw threaded stem with a piston connected thereto, a split nut, a spindle having a screw threaded connection to the parts of said nut, said spindle extending outwardly through the sides of the grease gun, the rotation of the spindle shifting the parts of the split nut in opposite directions to clamp or release the said stem.

2. In a grease gun having a tubular barrel with a screw threaded stem extending therein and having a piston, a head on one end of the barrel having an opening for the stem, a split nut having parts slidably mounted in the said head with a spindle having right and left hand threads engaging the parts of the nut, said spindle extending outwardly through the barrel, the rotation of the spindle shifting the parts of the nut to clamp or release the said stem.

3. In a grease gun having a tubular barrel, a closure head at one end of the barrel formed of a disk with an opening therethrough, a screw threaded stem extending through said opening and having a piston on the inner end, a split nut having two separable parts slidably mounted in the said disk, a transverse spindle having right and left threads extending through the barrel, the rotation of the spindle shifting the parts of the split nut transversely to clamp or release the stem.

4. In a grease gun having a tubular barrel with a closure head in the form of a disk having an opening, with a screw threaded stem extending through the opening, a piston on the inner end of the stem, a bracket depending from the disk and having a partition with a perforation connected thereto, a transverse spindle extending through the perforation and having right and left screw threads on opposite sides of said partition, and a split nut having two parts each engaged by one of the threads on the spindle, the rotation of the spindle shifting the parts of the nut to clamp or release the said stem.

5. In a grease gun having a tubular barrel with a head at one end formed of a disk with an opening therethrough, a first bracket depending from the disk and having a connection to the barrel, a second bracket depending from the disk and also having connections to the barrel, the said second bracket having guide surfaces, a split nut having two parts each guided by the said surfaces of the second bracket, a spindle having right and left threads engaging the said parts of the nut, the spindle extending outwardly through the barrel, the rotation of the spindle shifting the parts of the nut to clamp or release the said stem.

6. In a grease gun as claimed in claim 5, the first bracket having a transverse partition with a perforation, the said spindle extending through the perforation and having the right and left hand threads on opposite sides of said partition.

7. In a grease gun having a tubular barrel, a head at one end having a disk-like closure structure at the end of the barrel with an opening therethrough, a screw threaded stem extending through the opening and having a piston in the barrel, a first bracket on the disk having a transverse partition with a perforation therethrough, a second bracket depending from the disk and having a flat bearing surface, means to attach the barrel to the said brackets, a split nut having two parts bearing and guided on the said surface and having lateral extensions, a spindle extending through the said perforation having reverse threads on opposite sides thereof engaging the said extensions of the nut, the spindle extending transversely through an opening in the barrel and having means to operate said spindle to clamp or release the said stem.

In testimony whereof I have signed my name to this specification.

RENÉ RAPELLIN.